United States Patent [19]

Fujioka et al.

[11] Patent Number: 5,032,936
[45] Date of Patent: Jul. 16, 1991

[54] TAPE TENSION APPARATUS

[75] Inventors: Souichirou Fujioka, Sakai; Hiroshi Okamoto, Nara, both of Japan

[73] Assignee: Matsusita Electric Industrial Co. Ltd., Osaka, Japan

[21] Appl. No.: 370,879

[22] Filed: Jun. 23, 1989

[30] Foreign Application Priority Data

Jun. 27, 1988 [JP] Japan .................................. 63-15824
Sep. 14, 1988 [JP] Japan ................................. 63-230431
Sep. 14, 1988 [JP] Japan ................................. 63-230432

[51] Int. Cl.$^5$ ............................................. G11B 15/43
[52] U.S. Cl. ...................................... 360/71; 360/70; 318/7; 242/75.3
[58] Field of Search ....................... 360/70, 71, 83, 84; 318/6, 7; 242/75, 75.3, 75.5, 75.51

[56] References Cited

U.S. PATENT DOCUMENTS

| | | | |
|---|---|---|---|
| 3,231,668 | 1/1966 | Nishiwaki et al. | 360/70 |
| 3,535,441 | 10/1970 | Grace | 360/70 |
| 3,809,335 | 5/1974 | Mantey | 242/75.51 X |
| 4,390,909 | 6/1983 | Sakamoto | 360/71 |
| 4,807,107 | 2/1989 | Fincher | 242/75 X |

OTHER PUBLICATIONS

"Latest Technical Data Collection for VTR Design" (issued from Japan Industrial Technology Center, the first edition, 1987, pp. 339-342).

Primary Examiner—Aristotelis M. Psitos
Assistant Examiner—David L. Robertson

[57] ABSTRACT

A tape traveling apparatus drives differentially a tracking control actuator and a tension control actuator by inputting simultaneously into a tension controller a tracking instruction signal inputted into a tracking controller, and variably adjusts an amplification of the tracking instruction signal inputted into the tension controller according to an output of a tension sensor for detecting a tension variation of a tape, thereby eliminating a differential error between the tracking control actuator and the tension control actuator.

14 Claims, 6 Drawing Sheets

TAPE TENSION APPARATUS

BACKGROUND OF THE INVENTION

1. Field of the Invention

The present invention relates to a tape traveling apparatus for travelling a magnetic tape while keeping constant the tension of the magnetic tape in a signal recording and playing back apparatus such as an audio tape recorder and video tape recorder (VTR), which uses the magnetic tape as a recording medium.

2. Description of Prior Art

For example, the tape traveling apparatus of a VTR has a tension control function for controlling the tension of a magnetic tape in order to reduce the gap loss for recording and playing back by pressing the magnetic tape against a rotating magnetic head with a proper pressing force and to reduce the jitter of signal to be played back by alleviating tape tension variation.

A control has previously been performed to keep the tension of a magnetic tape at a proper value by installing a tension detector for detecting the tension of the magnetic tape and by controlling the driving torque of a supply reel on which the magnetic tape is wound according to the detected result. Such control is disclosed in, for example, "Latest Technical Data Collection for VTR Design" (issued from Japan Industrial Technology Center, the first edition, 1987).

According to the above control method, however, a feedback control system to tension variation is constructed, so that a phase lag element depending on the control band exits. Thus, a problem develops that a sufficient inhibition effect for dynamically controlling the position of a magnetic tape cannot be obtained in order that a magnetic head scans correctly the recording track on the magnetic tape. In this case, an increased control gain of tension control can solve this problem. However, another problem still exists that there is usually a mechanical looseness between the supply reel and the driving mechanism for driving the supply reel such as for a casettee tape VTR, and an increased control gain causes a backlash to develop due to the looseness, with the result that the control gain cannot be sufficiently secured.

SUMMARY OF THE INVENTION

It is an object of the present invention to provide a tape traveling apparatus which can sufficiently suppress the tension variation occuring when a tracking control is performed by controlling dynamically the position of a magnetic tape in order that a magnetic head can scan correctly the recording track on the magnetic tape.

In order to achieve this object, the present invention provides a system which drives differentially an actuator for the tracking control and an actuator for the tension control by inputting simultaneously an instruction signal inputted into tracking control means into tension control means. The system also eliminates a differential error between the tracking control actuator and the tension control actuator by variably adjusting the instruction signal inputted into the tension control means according to an output of a tension sensor for detecting a tension variation.

According to the system, the instruction signal inputted into the tracking control means is inputted simultaneously into the tension control means, so that the tension control actuator can be driven without a phase lag to the tension variation resulting from the tracking control, with the result that a high tension variation suppressing ratio can be obtained. In addition, the instruction signal inputted into the tension control means is adjusted adaptively by the output from the tension sensor, so that the differential error between the tracking control actuator and the tension control actuator due to variations of mechanical accuracy and electric-element characteristic accuracy is absorbed quickly, with the result that the tension variation converges on zero.

Accordingly, the tension variation occuring due to the tracking operation is substantially eliminated, the touch of a magnetic head with a magnetic tape is kept proper, the jitter of signal to be played back becomes extremely small, and at the same time the damage to the magnetic tape becomes extremely small.

DESCRIPTION OF THE PREFERRED EMBODIMENTS

Figure 1:
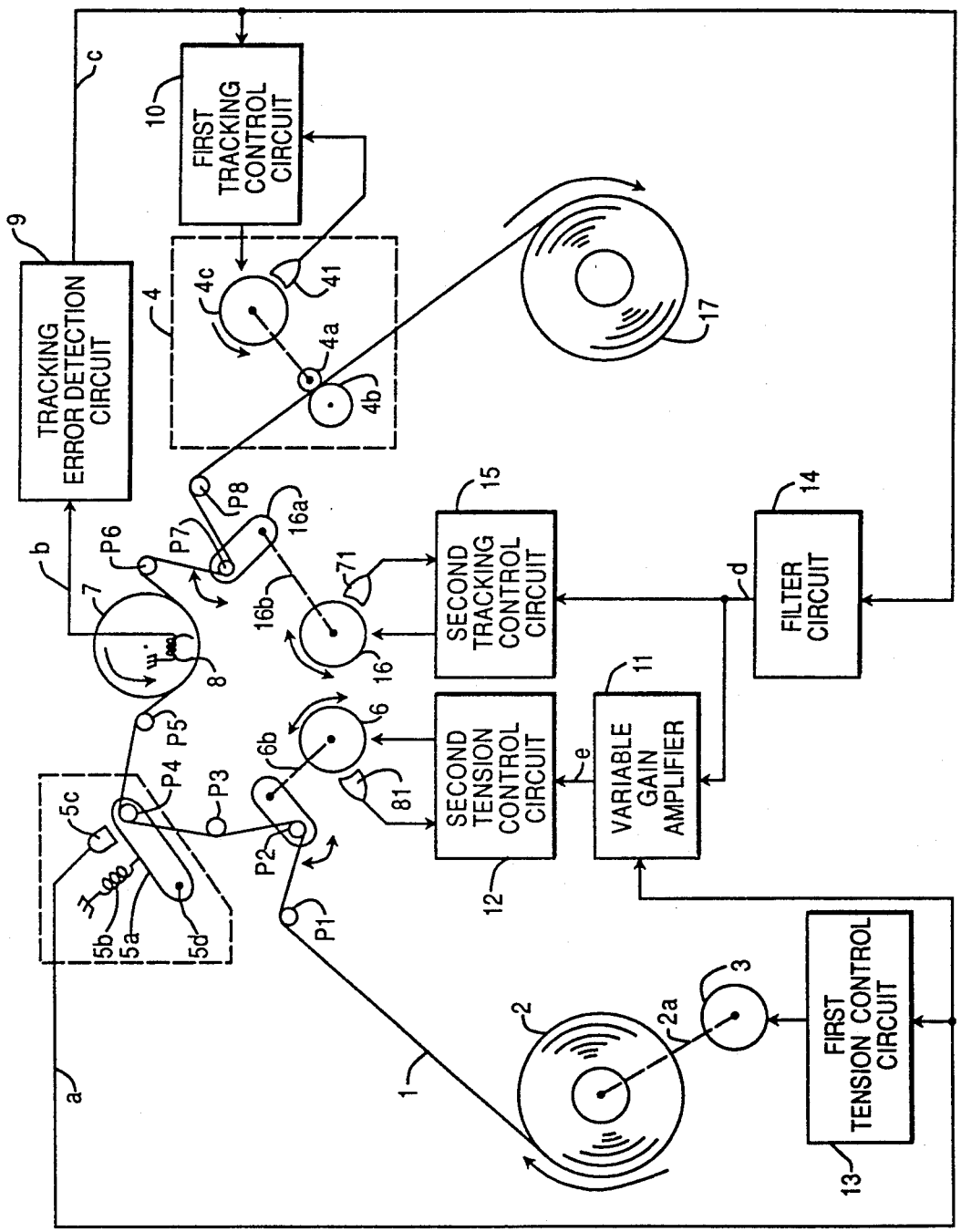
FIG. 1 is a schematic structural diagram of a tape traveling apparatus in an embodiment according to the present invention.

In FIG. 1, a supply reel 2 on which a magnetic tape 1 has been wound is driven through its concentric shaft 2a by a reel motor 3. A tape transfer section 4 pulls the magnetic tape 1 out of the supply reel 2 and transfers the tape. The tape transfer section 4 comprises a capstan shaft 4a driven directly by a capstan motor 4c, and a pinch roller 4b for pressing the magnetic tape 1 against the capstan shaft 4a.

The magnetic tape 1 is pulled out of the supply reel 2, transferred through posts P1, P2, P3, P4, P5, P6, P7 and P8 to the tape transfer section 4 and then taken up by a takeup reel 17. In a tension detection section 5, an arm 5a is supported pivotally around a shaft 5d on one end of the arm 5a, and a post P4 is installed on another end. The arm 5a is also pulled by a spring 5b. The magnetic tape 1 is stretched over the post P4, and the tension of the tape is detected through a variation in the arm 5a position due to the balance between the tension of the magnetic tape 1 and the spring force of the spring 5b. The variation in the arm 5a position is detected by a position sensor 5c. The position sensor 5c can be embodied by, for example, a hall element. In this case, a magnet is installed on the arm 5a to detect a change in magnetic force, so that the change in the arm 5a position will be detected.

An output of the tension detection section 5, that is, an output a of the position sensor 5c is inputted into a first tension control circuit 13. The first tension control circuit 13 controls the reel motor 3 to give the magnetic tape 1 an appropriate back tension.

One end of an arm 6a is installed through a rotating shaft 6b on a second actuator 6. A second moving-post P2 is installed on another end of the arm 6a. That is, the position of the second moving-post P2 changes according to an angle of the second actuater 6. A change in the post P2 position is detected by a position sensor 81.

A magnetic head 8 is incorporated in a rotating drum 7. The magnetic head rotates together with the rotating drum 7, to scan helically the recording track on the magnetic tape 1, and outputs a play back output b.

A tacking error detection circuit 9, as described later, detects from the playback output b of the magnetic head 8, a dislocation between the position of the track recorded on the magnetic tape 1, and the scanning position of the magnetic head 1 to obtain a signal c. The detected output c from the tracking error detection circuit 9 is inputted into a first tracking control circuit 10. The first tracking control circuit 10, as described later, refers to an output from a pulse generator 41 for generating a pulse synchronised with the rotating phase of the capstan motor 4c, drives the tape transfer section 4 according to the output c from the tracking error detection circuit 9, travels the magnetic tape 1 at an approximately constant speed, and controls its traveling phase so as to correct a tracking error, i.e., a dislocation between the scanning position of the magnetic head 1 and the recorded track position on the magnetic tape 1. The moment of inertia of the capstan motor 4c in the tape transfer section 4 is usually about hundreds of g cm$^2$. Thus, the tracking control by the capstan motor 4c can respond only to the low frequency near the DC component because the input power become excessively large. Therefore, the DC component of tracking error is corrected by the tape transfer section 4 and the first tracking control circuit 10.

In addition, the output c from the tracking error detection circuit 9 is inputted through a filter circuit 14 into a second tracking control circuit 15. The filter circuit 14, which may be a high-pass filter, passes a component d having a higher frequency than a specified frequency of the output c from the tracking error detection circuit 9. The second tracking control circuit 15, as described later, refers to an output from a position sensor 71 for detecting the post P7 position, and drives and controls a first actuator 16 according to the output d from the filter circuit 14.

One end of an arm 16a is installed through a rotating shaft 16b on the first actuator 16. A first moving-post P7 is installed on another end of the arm 16a, and the position of the first moving-post P7 is changed according to an angle of the first actuater 16. That is, the second tracking control circuit 15 controls the position of the first moving-post P7 according to the output d from the filter circuit 14, increases or decreases a path length of the magnetic tape 1 from the post P6 to the post P8 along the posts P6, P7 and P8, and controls a travel phase of the magnetic tape 1 on the rotating drum 7 in a high-frequency region so as to align the recording track position on the magnetic tape 1 with the scanning trace of the magnetic head 8.

In addition, the output d from the filter circuit 14 is inputted into a variable gain amplifier 11. The variable gain amplifier 11 amplifies the output d from the filter circuit 14 to output a signal e. The amplification gain is changed according to the output a from the tension detection circuit 5. The second tension control circuit 12 drives the second actuater 6 according to the output signal e from the variable gain amplifier 11 to control the position of a second moving-post P2 so that a tension variation of the magnetic tape 1 generated by the tracking control operation (position control operation of the first moving-post P7) is removed.

That is, when, with the position change of the first moving-post P7 by the second tracking control circuit 15, the travel phase of the magnetic tape 1 on the rotating drum 7 is advanced and the magnetic tape 1 tends to be pulled out of the supply reel 2, the second moving-post P2 is driven by the second tension control circuit 12 in such a direction that a path length of the magnetic tape 1 from the post P1 to the post P3 along the posts P1, P2 and P3 is shortened and the magnetic tape 1 is loosened. Conversely, when, with the position change of the first moving-post P7 by the second tracking control circuit 15, the travel phase of the magnetic tape 1 on the rotating drum 7 is delayed and the magnetic tape 1 tends to be taken up to the supply reel 2, the second moving-post P2 is driven by the second tension control circuit 12 in such a direction that the path length of the magnetic tape 1 from the post P1 to the post P3 along the posts P1, P2 and P3 is lengthened and the magnetic tape 1 is stretched. Also, the magnitude of the change in the second moving-post P2 position is automatically adjusted by the variable gain amplifier 11 according to the output a from the tension detection circuit 5 to make the tension variation minimum.

Hereinafter, the operation of each component in FIG. 1 will be explained.

Figure 2:
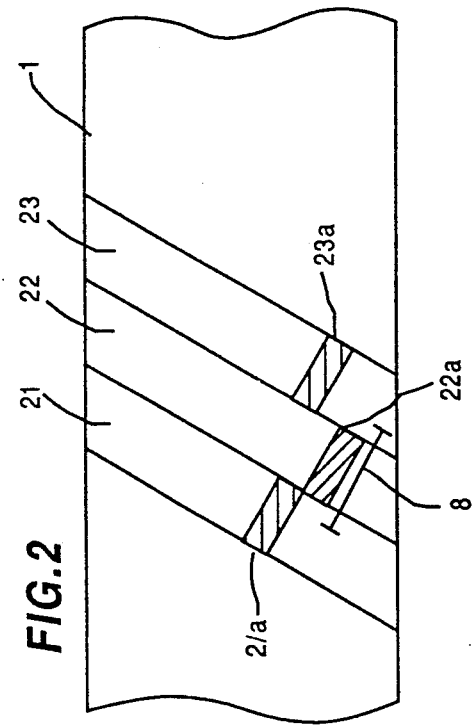
FIG. 2 is a concept diagram showing a state of a track recorded on the magnetic tape 1 in FIG. 1.

As shown in FIG. 2, tracks 21, 22 and 23 recorded on the magnetic tape 1 are provided with areas 21a, 22a and 23a, respectively, on which frequency signals f1, f2 and f3 are recorded.

Figure 3:
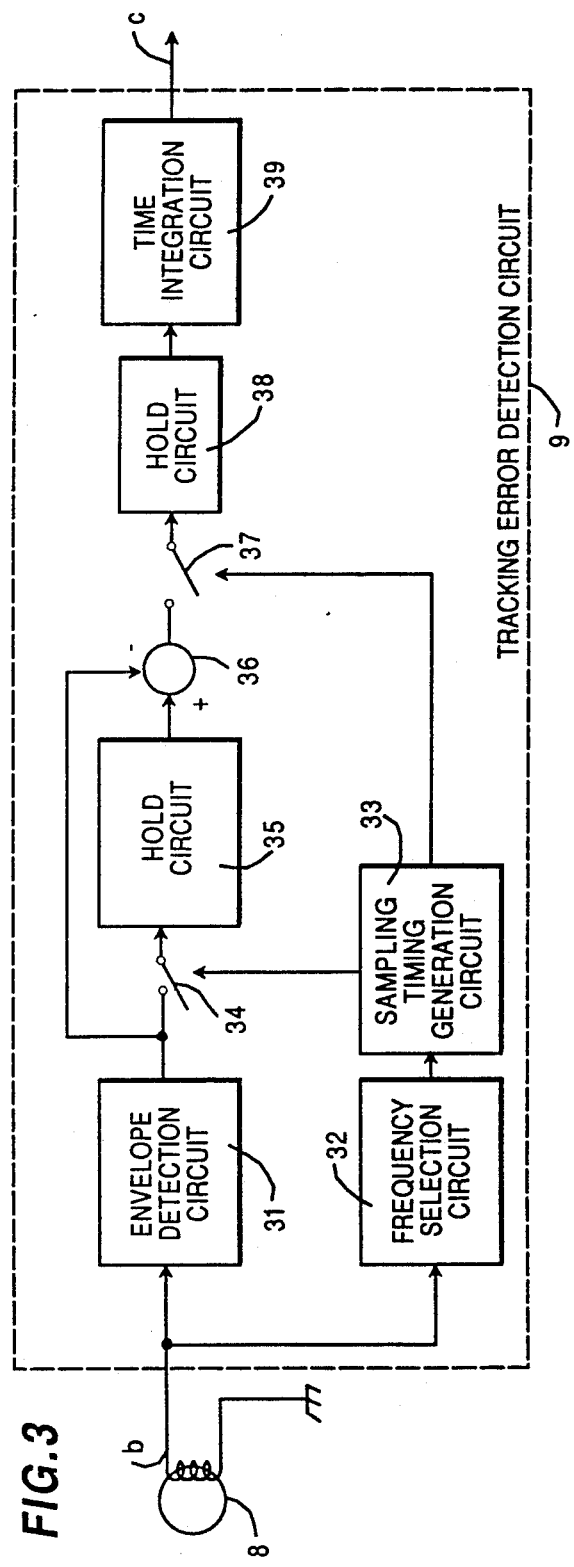
FIG. 3 is a block diagram showing a specific arrangement of the tracking error detection circuit 9 in FIG. 1.

The tracking error detection circuit 9 is arranged specifically, for example, as shown in FIG. 3. In FIG. 3, when the magnetic head 8 scans the track 22 shown in FIG. 2, the playback output b from the magnetic head 8 is first inputted into a frequency selection circuit 32. The frequency selection circuit 32 detects the frequency signal f2. The detection of the frequency signal f2 means that the magnetic head 8 scans a position in the area 22a shown in FIG. 2. The result detected by the frequency selection circuit 32 is inputted into a sampling timing generation circuit 33. The frequency selection circuit 32 comprises, for example, a band-pass filter. When the fact that the magnetic head 8 is scanning the area 22a is detected by the frequency selection circuit 32 the sampling timing generation circuit 33 closes switches 34 and 37 after times t1 and t2, respectively, each for a specified time. The times t1 and t2 are set so that the scanning position of the magnetic head 1 after time t1 will reach the area 21a, and the scanning position of the magnetic head 1 after time t2 will reach the area 23a. The playback output b from the magnetic head 8 is also inputted into an envelope detection circuit 31. The envelope detection circuit 31 detects an envelope of the playback signal b. When the switch 34 is closed for the specified time, time t1 after the scanning position of the magnetic head 8 has been detected by the frequency selection circuit 32 to be within the area 22a, an output from the envelope detection circuit 31 is held thereafter by a hold circuit 35. At this time, the frequency signal f1 of the area 21a on the adjacent track 21 is played back with the magnetic head 1 by crosstalk. Also, when the switch 37 is closed for the specified time after time t2, a signal obtained by subtracting a current output of the envelope detection circuit 31 from the signal having been previously held after time t1 by means of a subtractor 36 is held by a hold circuit 38. At this time, the frequency signal f3 of the area 23a on the adjacent track 23 is played back with the magnetic head 1 by crosstalk. That is, such consecutive operation causes the dislocation between the track 22 and the scanning position of the magnetic head 8 to be detected when the magnetic head 8 scans the track 22. Also, a time integration circuit 39 integrates an output from the hold circuit 38 with respect to time and outputs the signal c.

Figure 4:
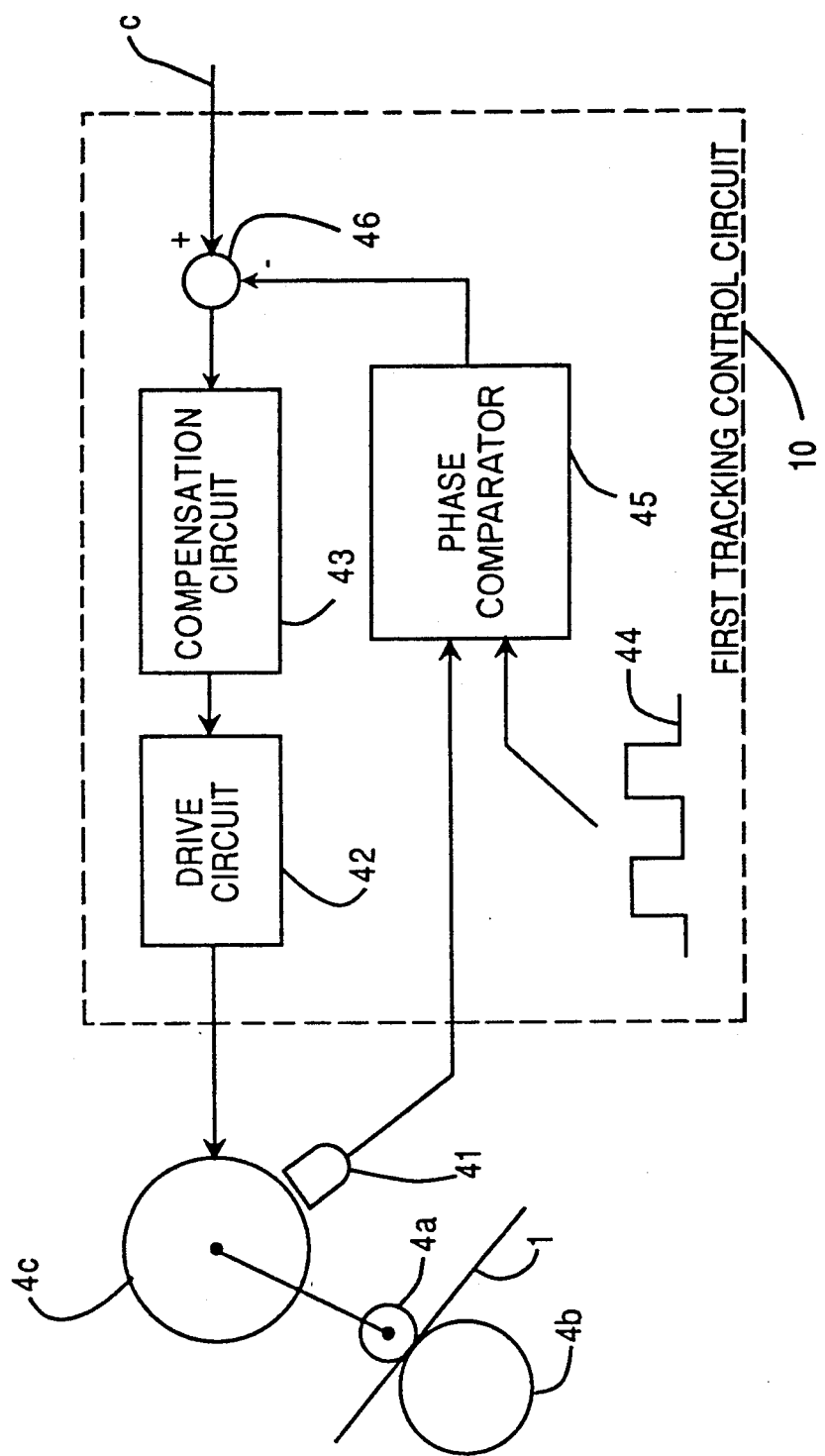
FIG. 4 is a block diagram showing a specific arrangement of the first tracking control circuit 10 in FIG. 1.

The first tracking control circuit 10 is arranged specifically, for example, as shown in FIG. 4. In FIG. 4, a phase difference between an output pulse from a pulse generator 41 for generating a pulse synchronised with the rotating phase of the capstan motor 4c and a reference pulse 44 is detected by a phase comparator 45. A subtractor 46 subtracts an output value of the phase comparator 45 from the output value c of the tracking error detection circuit 9. The resultant error signal is inputted into a compensation circuit 43. The compensation circuit 43 emphasizes a higher frequency component than a specified frequency of an output signal from the subtractor 46 at +6 dB/oct to secure the stability of the control loop. The output of the compensation circuit 43 is inputted into a drive circuit 42 which drives the capstan motor 4c to generate a torque. That is, the rotating phase of the capstan motor 4c is allowed to increase or decrease by an amount corresponding to the output c from the tracking error detection circuit 9. Finally, the operation is performed in such a manner that the travel phase of the magnetic tape 1 is corrected according to the output c from the tracking error detection circuit 9 so as to eliminate the dislocation of the scanning position of the magnetic head 8 from the track position on the magnetic tape 1.

Figure 5:
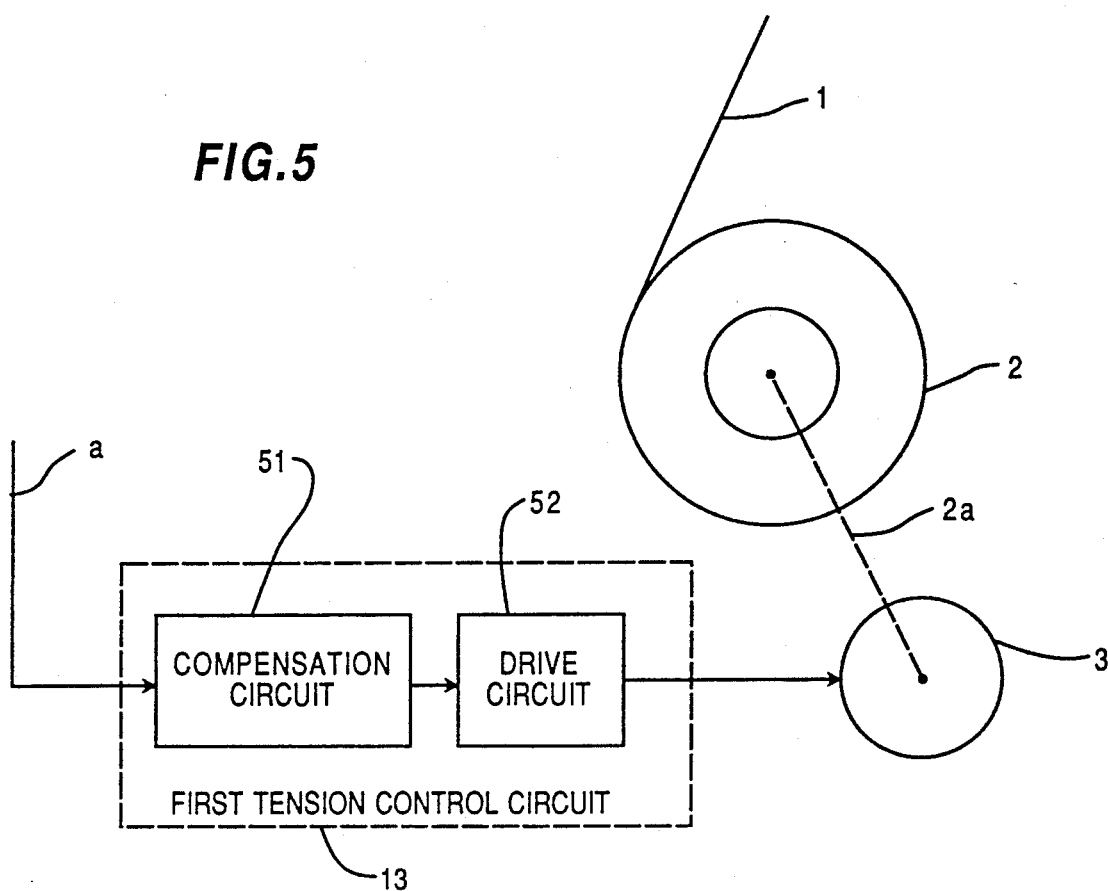
FIG. 5 is a block diagram showing a specific arrangement of the first tension control circuit 13 in FIG. 1.

The first tension control circuit 13 is arranged specifically, for example, as shown in FIG. 5. In FIG. 5, the output a from the tension detection circuit 5 is inputted into a compensation circuit 51. The compensation circuit 51 emphasizes a higher frequency component than a specified frequency at +6 dB/oct. An output from the compensation circuit 51 is inputted into a drive circuit 52 which drives the reel motor 3 to generate a torque to control the back tension of the magnetic tape 1 at an approximately constant value.

Figure 6:
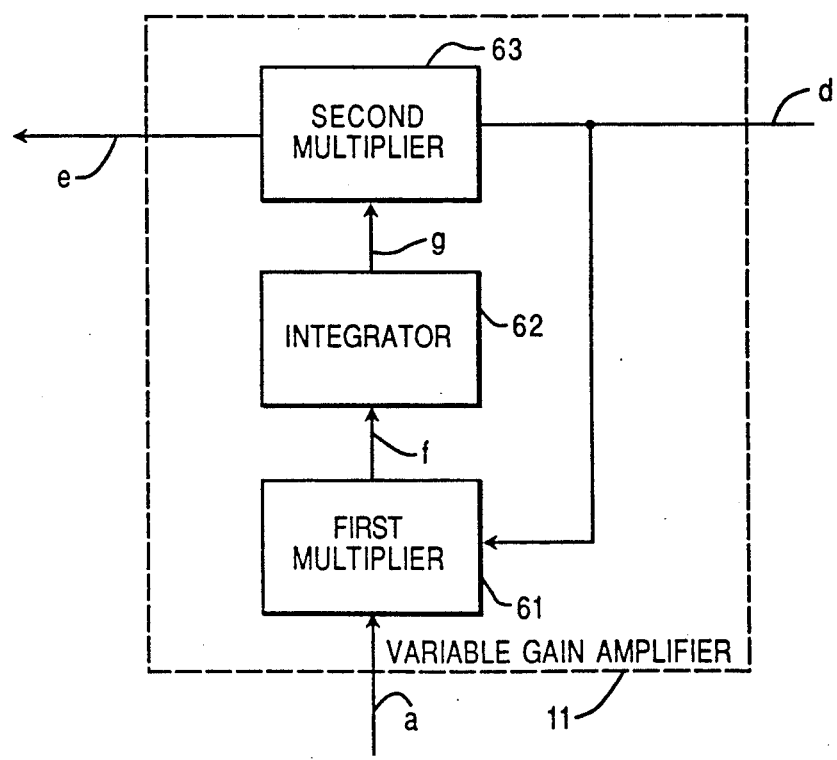
FIG. 6 is a block diagram showing a specific arrangement of the variable gain amplifier 11 in FIG. 1.

The variable gain amplifier 11 is arranged specificaly, for example, as shown in FIG. 6. In FIG. 6, the output d from the filter circuit 14 and the output a from the tension detection section 5 are multiplied in a first multiplier 61. The first multiplier 61 outputs a signal f which is the multiplied result. The signal f is inputted into an integrator 62 by which it is integrated with respect to time. The integrator 62 outputs a signal g which is the integrated result. A second multiplier 63 multiplies the output d (the high-frequency component of the output c from the tracking error detection circuit 9) from the filter circuit 14 by the signal g to generate the output signal e. That is, the variable gain amplifier 11 amplifies the output d (the high-frequency component of the output c from the tracking error detection circuit 9) from the filter circuit 14 with a gain (the value of the signal g) corresponding to the output a from the tension detection section 5. Then, the gain adjustment converges so that tension variation becomes zero.

Figure 7:
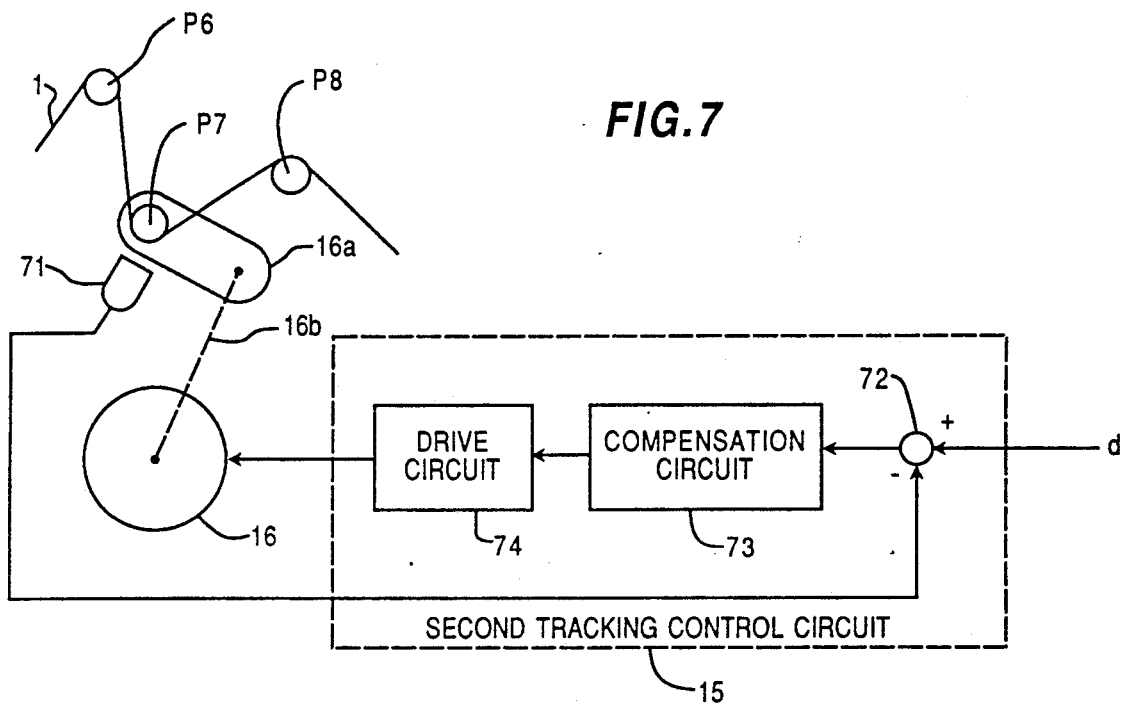
FIG. 7 is a block diagram showing a specific arrangement of the second tracking control circuit 15 in FIG. 1.

The second tracking control circuit 15 is arranged specifically, for example, as shown in FIG. 7. In FIG. 7, a subtractor 72 subtracts an output value of a position sensor 71 for detecting the position of the first moving-post P7 from the output value d of the filter circuit 14 to obtain an error signal. The resultant error signal is inputted into a compensation circuit 73. The compensation circuit 73 emphasizes, a higher frequency component than a specified frequency of an output signal from the subtractor 72 at +6 db/oct to secure the stability of the control loop. The output of the compensation circuit 73 is inputted into a drive circuit 74 which drives the first actuator 16 to generate a torque to drive through the shaft 16b and the arm 16a the first moving-post P7 to effect position control. Also, the position sensor 71 can be embodied in a similar manner to that for the position sensor 5c of the tension detection section 5 described previously.

Figure 8:
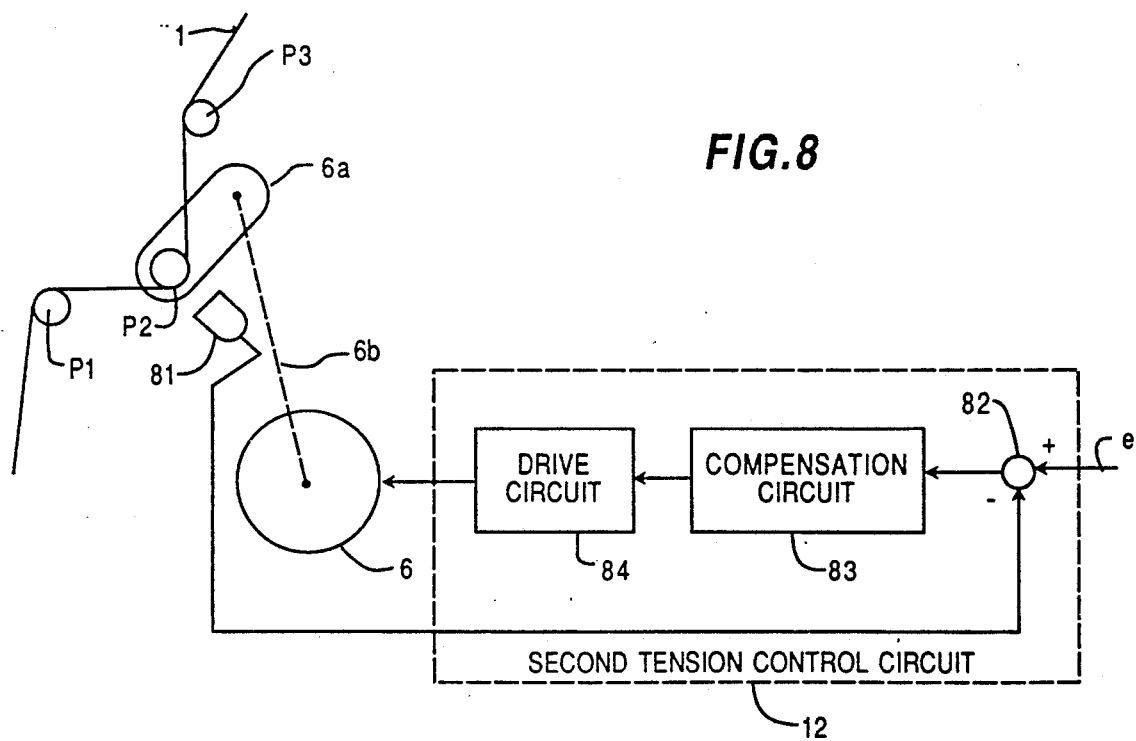
FIG. 8 is a block diagram showing a specific arrangement of the second tension control circuit 12 in FIG. 1.

The second tension detection circuit 12 is arranged specifically, for example, as shown in FIG. 8. In FIG. 8, a subtractor 82 subtracts an output value of a position sensor 81 for detecting the position of the second moving-post P2 from the output value e of the variable gain amplifier 11 to obtain an error signal. The resultant error signal is inputted into a compensation circuit 83. The compensation circuit 83 emphasizes a higher frequency component than a specified frequency of an output signal from the subtractor 82 at +6 dB/oct to secure the stability of the control loop. The output of the compensation circuit 83 is inputted into a drive circuit 84 which drives the second actuator 6 to generate a torque to drive through the shaft 6b and the arm 6a the second moving-post P2 to effect position control. Also, the position sensor 81 can be embodied in a similar manner to that for the position sensor 5 of the tension detection section 5 described previously.

Now, as mentioned above, when the magnetic tape 1 is traveled at an approximately constant speed by the tape transfer section 4, the tension detection section 5 detects a tension of the magnetic tape 1, and accordingly the first tension control circuit 13 controls a torque of the reel motor 3 and gives the magnetic tape 1 a proper back tension. In addition, when the tracking error detection circuit 9 detects a dislocation between the recording track position on the magnetic tape 1 and the scanning position of the magnetic head 8, the first tracking control circuit 10 controls the tape transfer section 4 and at the same time the second tracking control circuit 15 controls the position of the first moving-post P7 so that the travel phase of the magnetic tape 1 on the rotating drum 7 is corrected, with the result that the dislocation between the recording track position on the magnetic tape 1 and the scanning position of the magenetic head 8 is eliminated. When the above tracking operation is repeated, the magnetic tape 1 tends to generate such a high-frequency tension variation that cannot be suppressed only by the first tension control circuit 13. However, the output from the tracking error detection circuit 9 is sent through the filter circuit 14 and the variable gain amplifier 11 to the second tension control circuit 12. The second tension control circuit 12 drives approximately differentially the second moving -post P2 to the tape transfer section 4 operation by the first tracking control circuit 10 and to the first moving -post P7 operation by the second tracking control circuit 15 so as to change the path length of the magnetic tape 1 from the post 1 to the post 3 to suppress the tension variation of the magnetic tape 1.

That is, when, with the position change of the first moving-post P7 by the second tracking control circuit 15, the travel phase of the magnetic tape 1 on the rotating drum 7 is advanced and the magnetic tape 1 tends to be pulled out of the supply reel 2, the second moving-post P2 is driven by the second tension control circuit 12 in such a direction that the path length of the magnetic tape 1 from the post P1 to the post P3 along the posts P1, P2 and P3 is shortened and the magnetic tape 1 is loosened. Conversely, when, with the position change of the first moving-post P7 by the second tracking control circuit 15, the travel phase of the magnetic tape 1 on the rotating drum 7 is delayed and the magnetic tape 1 tends to be taken up to the supply reel 2, the second moving-post P2 is driven by the second tension control circuit 12 in such a direction that the path length of the magnetic tape 1 from the post P1 to the post P3 along the posts P1, P2 and P3 is lengthened and the magnetic tape 1 is stretched.

Also, the gain of the variable gain amplifier 11 is adjusted by the output from the tension detection section 5, and converges on the point where tension variation is eliminated.

Although a tape traveling apparatus in one embodiment of the present invention has been explained, it is preferred to equalize the control frequency characteristic (pole arrangement) of the second tracking control circuit 15 for controlling the travel phase of the magnetic tape 1 with the control frequency characteristic (pole arrangement) of the second tension control circuit 12 so as to secure the stability of the total system in the tape traveling apparatus.

Also, it is preferred that the control frequency charactristic of the first tension control circuit 13 is wider in band than the control frequency characteristic of the first tracking control circuit 10.

Figure 9:
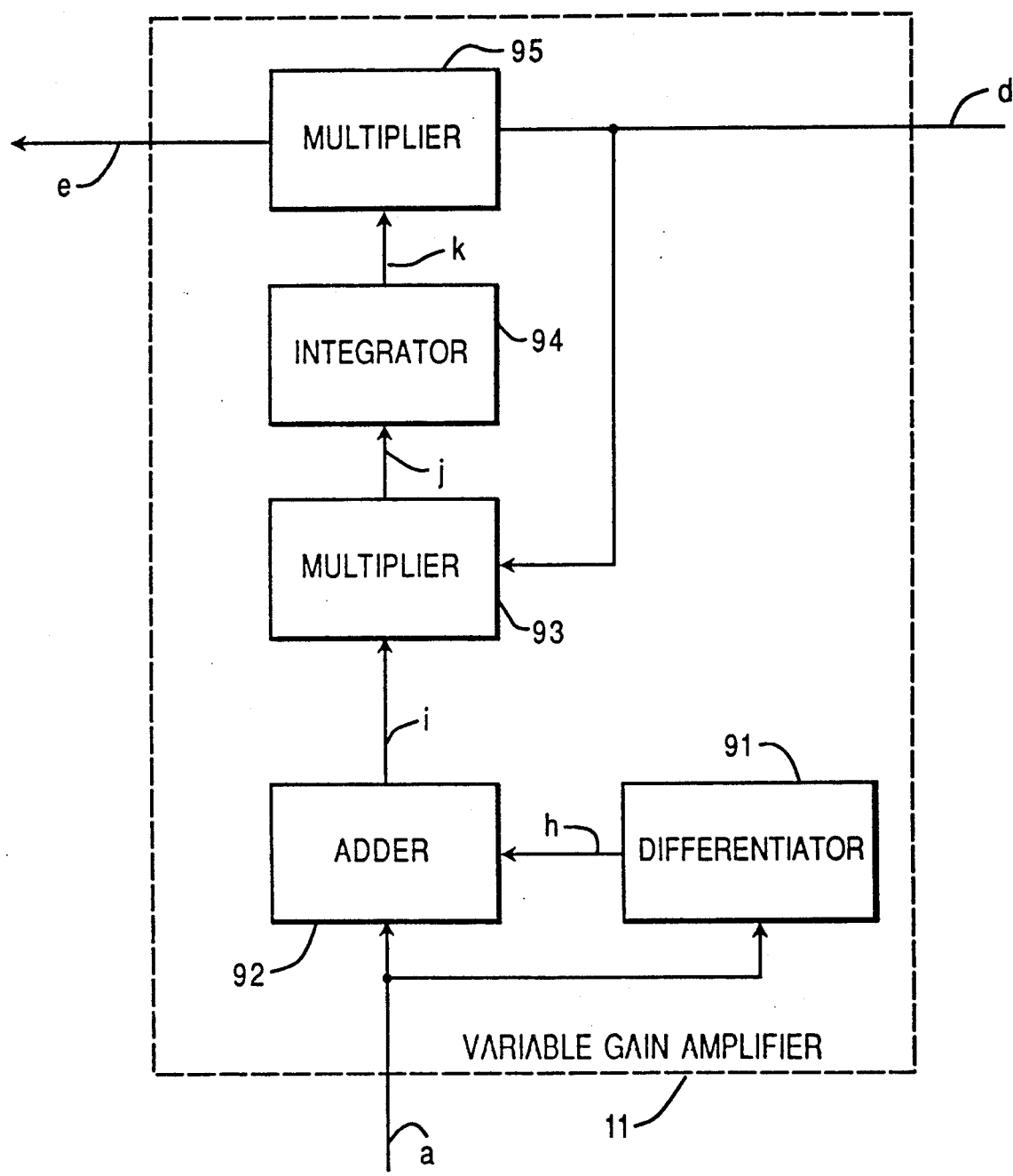
FIG. 9 is a block diagram showing another specific arrangement of the variable gain amplifier 11 in FIG. 1.

In addition, the variable gain amplifier 11 may be arranged as shown in FIG. 9. In FIG. 9, the output a from the tension detection section 5 is differentiated by a differentiator 91. The differntiator 91 outputs a signal h which is the differentiated result. An adder 92 adds the signal a and the signal h with a specified gain, and outputs a signal i which is the added result. In addition, a multiplier 93 multiplies the signal i by the output d of the filter circuit 14, and outputs a signal j which is the multiplied result. An integrator 94 integrates the signal j with respect to time, and outputs a signal k which is the integrated result. A multiplier 95 multiplies the output d of the filter circuit 14 and the signal k to obtain the output signal e. In this case, the operation of the differentiator 91 causes a phase lead compensation to be performed in the process of the gain (the value of the signal k) adjustment, resulting in an improved stability of the gain adjustment operation.

Although the case where the present invention is applied to the tape traveling system of VTR has been specifically described, various applications to those other than this embodiment can be made without departing from the spirit of the present invention, and the present invention is not limited to this embodiment.

Any apparatus having such a tape traveling system that has first and second tape drive means and tension detection means for driving a tape-shaped medium can be embodied according to the present invention. That is, a modification may be made in such a manner that an instruction signal (the output signal c from the tracking error detection circuit 9 in this embodiment) inputted into one set of tape drive means is simultaneously allowed to input another set of tape drive means by variable amplification adjusting of the instruction signal according to the tension detection means.

In this embodiment, it will be apparent that the tape transfer section 4 and the first acuator 16 comprise one set of tape drive means, and the reel motor 3 and the second actuator 6 comprise another set of tape drive means.

What is claimed is:

1. A tape traveling apparatus comprising:
   first tape drive means and second tape drive means for driving a manetic tape at separated two points respectively;
   tension detection means for detecting a tension of said magnetic tape between said first tape drive means and said second tape drive means;
   tape travel instruction means for producing an instruction signal indicating a drive condition of said magnetic tape;
   first control means for controlling said first tape drive means according to said instruction signal;
   variable gain amplification means for variably amplifying said instruction signal according to an output of said tension detection means; and
   second control means for controlling said second tape drive means according to an output of said amplification means.

2. A tape traveling apparatus as in claim 1, wherein said variable gain amplification means comprises:
   a first multiplier for multiplying the output of said tension detection means by the instruction signal;
   an integrator for integrating with respect to time a multiplied result of said first multiplier; and
   a second multilier for multiplying the instructin signal by an integrated result of said integrator,
   a multiplied result of said second multiplier being fed to said second drive means.

3. A tape traveling apparatus as in claim 1, wherein said variable gain amplification means comprises:
   a differentiator for differentiating with respect to time the output of said tension detection means;
   an adder for adding the output of said tension detection means and a differentiated result of said differentiator;
   a first multiplier for multiplying an added result of said adder by the instruction signal; an integrator for integrating with respect to time a multiplied result of said first multiplier; and
   a second multiplier for multiplying the instruction signal by an integrated result of said integrator, a multiplied result of said second multiplier being fed to said second drive means.

4. A tape traveling apparatus in a helical-scan type magnetic recording and playing back apparatus, comprising:
   reel drive means for driving a supply reel on which a magnetic tape has been wound;
   tape transfer means for pulling said magnetic tape out of said supply reel through a rotating drum on which a magnetic head is mounted and traveling the tape at an approximately constant speed;
   tension detection means for detecting a tension of said magnetic tape;
   a moving-post installed between said supply reel and said tape transfer means for variably regulating a length of said magnetic tape between said supply reel and said tape transfer means;
   actuator means for driving said moving-post;
   tracking error detection means for detecting a dislocation between a recording track on said magnetic tape and a scanning position of said magnetic head;

tracking control means for controlling a travel phase of said magnetic tape by controlling said tape transfer means according to an output of said tracking error detection means;

first tension control means for controlling said reel drive means according to an output of said tension detection means;

variable gain amplication means for variably amplifying the output of said tracking error detection means according to the output of said tension detection means; and second tension control means for controlling a position of said moving-post by driving said actuator means according to an output of said variable gain amplification means.

5. A tape traveling appraratus as in claim 4, wherein said variable gain amplification means comprises:
a first multiplier for multiplying the output of said tension detection means by the output of said tracking error detection means;
an integrator for integrating with respect to time a multiplied result of said first multiplier; and
a second multiplier for multiplying the output of said tracking error detection means by an integrated result of said integrator, a multiplied result of said second multiplier being fed to said second tension control means.

6. A tape traveling apparatus as in claim 4, wherein said variable gain amplification means comprises:
a differentiator for differentiating with respect to time the output of said tension detection means;
an adder for adding the output of said tension detection means and a differentiated result of said differentiator;
a first multiplier for multiplying an added result of said adder by the output of said tracking error detection means;
an integrator for integrating with respect to time a multiplied result of said first multiplier; and
a second multiplier for multiplying the output of said tracking error detection means by an integrated result of said integrator, a multiplied result of said second multiplier being fed to said second tension control means.

7. A tape traveling apparatus as in claim 6, wherein a frequency characteristic of the second tension control means is substantially the same as a frequency characteristic of the tracking control means.

8. A tape traveling apparatus as in claim 4, wherein a frequency characteristic of the second tension control means is substantially the same as a frequency characteristic of the tracking control means.

9. A tape traveling apparatus in a helical-scan type magnetic recording and playing back apparatus, comprising:
reel drive means for driving a supply reel on which a magnetic tape has been wound;
tape transfer means for pulling said magnetic tape out of said supply reel through a rotating drum on which a magnetic head is mounted and traveling the tape at an approximately constant speed;
tension detection means for detecting a tension of said magnetic tape;
first and second moving-posts installed between said supply reel and said tape transfer means for variablly regulating a length of said magnetic tape between said supply reel and said tape transfer means;
first and second actuator means for driving said first and said second moving-posts, respectively;
tracking error detection means for detecting a dislocation between a recording track on said magnetic tape and a scanning position of said magnetic head;
first tracking control means for controlling a travel phase of said magnetic tape by controlling said tape transfer means according to an output of said tracking error detection means;
second tracking control means for changing a position of said first moving-post by controlling said first actuator means according to the output of said tracking error detection means;
first tension control means for controlling said reel drive means according to an output of said tension detection means;
variable gain amplification means for variably amplifying the output of said tracking error detection means according to the output of said tension detection means; and
second tension control means for controlling a position of said second moving-post by driving said second actuator means according to an output of said variable gain amplification means.

10. A tape traveling apparatus as in claim 9, wherein said variable gain amplification means comprises:
first multiplier for multiplying the output of said tension detection means by the output of said tracking error detection means;
an integrator for integrating with respect to time a multipled result of said first multiplier; and
second multiplier for multiplying the output of said tracking error detection means by an integrated result of said integrator, a multiplied result of said second multiplier being fed to said second tension control means.

11. A tape traveling apparatus as in claim 10, wherein a frequency characteristic of the second tension control means is substantially the same as a frequency characteristic of the second tracking control means.

12. A tape traveling apparatus as in claim 9, wherein said variable gain amplification means comprises:
a differentiator for differentiating with respect to time the output of said tension detection means;
an adder for adding the output of said tension detection means and a differentiated result of said differentiator;
a first multiplier for multiplying an added result of said adder by the output of said tracking error detection means;
an integrator for integrating with respect to time a multiplied result of said first multiplier; and
a second multiplier for multiplying the output of said tracking error detection means by an integrated result of said integrator, a multiplied result of said second multiplier being fed to said second tension control means.

13. A tape traveling apparatus as in claim 12, wherein a frequency characteristic of the second tension control means is substantially the same as a frequency characteristic of the second tracking control means 14. A tape traveling apparatus as in claim 9, wherein a frequency characteristic of the second tension control means is substantially the same as a frequency characteristic of the second tracking control means.

* * * * *